Figure 1:
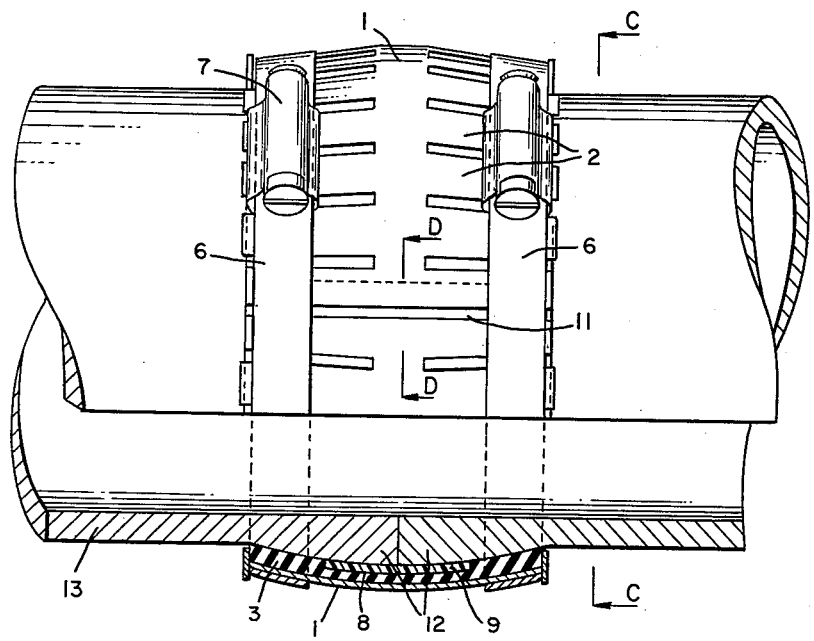
Figure 2:
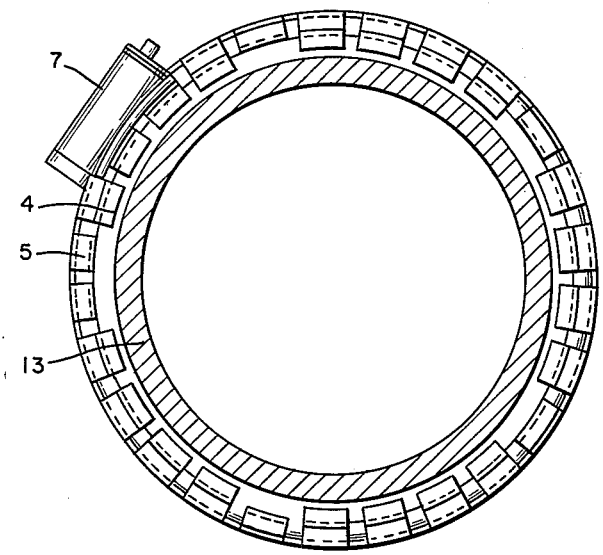
Figure 3:
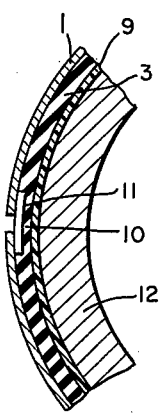

Sept. 24, 1963    J. P. A. MacDONALD ETAL    3,104,898
TUBE COUPLERS
Filed Feb. 24, 1959

INVENTOR
JOHN PARK ALLAN MACDONALD
GEORGE BARRONS WHYTE

BY Cushman, Darby & Cushman
ATTORNEY

3,104,898
TUBE COUPLERS
John Park Allan MacDonald and George Barrons Whyte, Edinburgh, Scotland, assignors to Scottish Agricultural Industries Limited, Edinburgh, Scotland, a corporation of Great Britain
Filed Feb. 24, 1959, Ser. No. 795,196
Claims priority, application Great Britain Feb. 24, 1958
2 Claims. (Cl. 285—236)

This invention relates to an improved form of coupling for tubes, pipes, hose and the like (hereinafter termed pipes), in particular to pipes having flared ends, and to assemblies of such pipes joined end to end by such couplings.

One object of the invention is to provide a pipe coupling suitable for use in assemblies of closely spaced parallel pipes such as banks of cooler pipes. Where flanged joints are used in such assemblies the minimum spacing between parallel lines of pipes is limited by the flanges and, in double banks, by the necessity to be able to tighten up the flange bolts on the inside of the double bank. Further, when using conventional jointing material in flange joints, it is frequently difficult, when making joints in such confined spaces, to ensure that no leakage will occur.

Another object of the invention is to provide a coupling for pipes constructed of relatively fragile material (e.g. glass, stoneware, carbon, silicon iron and plastics etc.) by a means which does not create tensile stress in the pipes. Where flanged joints are used, tensile stress can arise from lack of normality of the jointing faces, misalignment of the pipe, movement of the supporting structure, thermal expansion or contraction of the pipes, or any combination of these causes. With the improved form of coupling the liability or extent of tensile stress from such causes is greatly reduced.

According to the present invention a coupling for coupling pipes having flared ends comprises a flexible fixing band which can be located peripherally around the meeting ends of the pipes, the band having a plurality of fingers extending from each edge, and ring clips for tightening the fingers over the flared ends of the pipes.

Preferably the extremities of the fingers are turned, some outwardly to locate and retain the ring clips, and some inwardly to locate and retain packing material which is interposed between the coupling and the pipes to seal the joint.

Preferably in an assembly comprising two pipes having flared ends joined by the coupling of the present invention, the meeting ends are surrounded by a compressible sealing sleeve which in turn is surrounded by the coupling, the fingers of which are pressed against the sleeve by the ring clips.

In one embodiment of the invention the compressible sealing sleeve used in the assembly is of composite structure, the main body of the sleeve having a recess in its internal face in which is located a cylindrical insert of compressible material particularly resistant to the fluid to be passed through the pipes, the insert being so located as to lie directly over the joint between the pipe ends.

In another embodiment of the invention the sleeve or, if the sleeve is of composite structure, the insert is provided with an integral inwardly projecting rib which is located between the ends of the pipes. This rib serves solely as a filler between the pipe ends, the joint being sealed as before by the pressure of the coupling on the compressible sleeve. The rib is particularly useful in assemblies to be operated under hygienic or aseptic conditions since it is adapted to fill up dead spaces between pipes, the end faces of which may be irregular or out of square.

One advantage of the coupling of the present invention is that it is compact and makes it possible to arrange parallel lines of pipes in very close relationship. Further, it is possible to fit and tighten up the coupling in very confined spaces. In addition, opposed axial forces acting on coupled pipes, the result for example of pressure in bends, tends to tighten the sealing sleeve still further on the flared ends. Another important advantage is that for general purposes it is not necessary for the pipe ends to be machine-finished or exactly normal to the axis of the pipe. The pipes themselves do not require to be exactly in alignment since the joint is sealed by the coupler compressing the sealing sleeve against the outer surface of the flared ends. Furthermore the joint remains sufficiently flexible to permit minor movement after tightening.

The flared ends of the pipes may be afforded by the initial shaping of the pipes or may be produced, if the pipes are deformable, by using suitably shaped inserts in the pipe ends to form a flaring. If the pipes do not possess sufficient rigidity in themselves for resisting the pressure of the ring clips, an inner compression tube within the pipe may be used to provide the requisite rigidity.

In corrosive conditions, such as in acid coolers, the metal parts of the coupling may be constructed in stainless steel. The compressible sleeve may suitably be of natural or synthetic rubber or similar materials according to conditions, and the specially resistant insert may be, for example, of a fluorinated hydrocarbon polymer (Teflon or Fluon) or a fully saturated fluorocarbon copolymer of chlorotrifluorethylene and vinylidene fluoride such as Kel–F Elastomer.

Although the compressible sleeve shown in the drawings is provided with a resistant insert, the insert and its recess may of course be dispensed with where the sleeve as a whole may be constructed of adequately resistant material. Alternatively, additional protection may be provided by wrapping resistant material in the form of thin sheet or foil about the joint, the sleeve then being located on top of this wrapping.

Various types of ring clips may be used, for example, a single or double wire type in place of the strip type shown in the drawings. Instead of tightening the clip by means of a screw or bolt a toggle hook may be used to pull the ends of the clip together, this having the particular advantage of speed in assembly.

A preferred form of the invention will now be described with reference to the accompanying drawings in which, FIGURE I shows partly sectioned the ends of two pipes joined by a coupling, FIGURE II is a section on the line "CC" in FIGURE I, FIGURE III is a section on the line "DD" in FIGURE I.

A fixing band 1, made from a flexible metal strip has a plurality of fingers 2 extending axially from each edge, the said band being of length slightly less than the external circumference of a sealing sleeve 3 which it surrounds. The extremities of the fingers are turned some inwardly, as at 4, and others outwardly, as at 5, to provide:

(a) Stops to locate and retain the sealing sleeve 3, and
(b) Stops to prevent ring clips 6 from sliding off the finger ends.

The ratio of extremities turned in to extermities turned out may be from 1 to 1 to 4 to 1.

The ring clips 6 as shown are of known type whereby the circumferential dimension can be altered as desired by the action of tangential screws such as 7. They are conical in section to conform to the flared pipe ends.

A sealing sleeve 3 of compressible material such as synthetic rubber has its inner face recessed 8 to receive and locate an insert 9 made from a material highly resistant to the fluid to be conveyed through the pipes. In the outer face of the sleeve is an axial recess 10 for receiving and locating a metal slip plate 11 on which rest the ends of the fixing band.

The several parts of the coupling referred to above are arranged to surround the joint and conically flared end portions 12 of meeting pipes 13 in the following manner:

Interposed between the fixing band 1 and the meeting pipes 13 is the sealing sleeve 3 which receives and locates the fluid resisting insert 9 directly over the joint between the ends of the pipes. Sealing is effected by the pressure of the ring clips exerted through the fingers 2 on each side of the joint against the compressible sleeve 3. It will be seen from the drawings that the flexible fixing band surrounding the junction between the meeting pipes together with the slip plate provides a continuous backing through which a uniform pressure is exerted by the ring clips clamping the sealing sleeve and its insert firmly around the joint as a result the joint is sealed against either pressure or vacuum in the pipes.

What we claim is:

1. A coupling comprising: two opposed pipes, each pipe having outwardly flaring exterior end surfaces and unbroken planar end walls substantially perpendicular to the longitudinal axis of the pipe in direct contact with one another; a compressible sealing sleeve surrounding said flared pipe ends; a flexible fixing band for location peripherally about the entire circumference of said sealing sleeve, said fixing band having a plurality of axially extending fingers about each end thereof, some of said fingers of each end of said band having outwardly turned extremities and some of said fingers at each end of said band having inwardly turned extremities to locate the ends of said sleeve within said fixing band; opposed independently securable ring tightening clips carried by said band for engaging said fingers against said sleeve, said outwardly turned extremities being operative to prevent said ring clips from slipping off said fixing band upon tightening thereof, said flexible band having a normally flat configuration therealong prior to tightening said clips and of a length sufficient to be located peripherally about susbtantially the entire circumferential length of said sealing sleeve whereby said pipe ends are moved longitudinally into coextensive engagement with one another upon tightening said ring clips.

2. Coupling defined in claim 1 wherein the peripheral ends of said pipes are surrounded by a fluid-resisting insert, and the sealing sleeve has a recess on its inner face for receiving said insert.

References Cited in the file of this patent

UNITED STATES PATENTS

| 1,106,761 | Pettibone | Aug. 11, 1914 |
| 1,358,633 | Hachmann | Nov. 9, 1920 |
| 1,448,615 | Deibert | Nov. 13, 1923 |
| 2,403,449 | Meyer et al. | July 9, 1946 |
| 2,426,423 | Woolsey | Aug. 26, 1947 |
| 2,451,438 | Hartman | Oct. 12, 1948 |
| 2,530,700 | Jewell | Nov. 21, 1950 |
| 2,547,983 | Slatteny | Apr. 10, 1951 |
| 2,688,500 | Scott | Sept. 7, 1954 |
| 3,029,095 | King | Apr. 10, 1962 |

FOREIGN PATENTS

| 3,108 | Great Britain | Feb. 7, 1902 |
| 20,283 | Great Britain | Sept. 5, 1912 |
| 767,005 | France | Apr. 23, 1934 |
| 359,010 | Italy | May 11, 1938 |
| 1,800 | Great Britain | Jan. 29, 1956 |